United States Patent [19]

Kawase et al.

[11] Patent Number: 5,545,101
[45] Date of Patent: Aug. 13, 1996

[54] FRICTION TYPE CONTINUOUSLY VARIABLE TRANSMISSION

[75] Inventors: Tatsuo Kawase; Naoshi Hattori, both of Iwata, Japan

[73] Assignee: NTN Corporation, Osaka, Japan

[21] Appl. No.: 275,712

[22] Filed: Jul. 19, 1994

[30] Foreign Application Priority Data

Jul. 20, 1993 [JP] Japan .................................. 5-178853
Jul. 20, 1993 [JP] Japan .................................. 5-178863
Aug. 31, 1993 [JP] Japan .................................. 5-215502

[51] Int. Cl.⁶ .................................................. F16H 15/16
[52] U.S. Cl. ........................ 475/193; 475/207; 475/215
[58] Field of Search .................................. 475/185, 190, 475/191, 193, 198, 201, 207, 214, 216; 476/27, 29, 30, 51, 55, 68

[56] References Cited

U.S. PATENT DOCUMENTS

| 2,216,190 | 10/1940 | Erban ........................ 475/216 |
| 2,580,392 | 1/1952 | Bade .......................... 475/193 |
| 5,318,486 | 6/1994 | Lutz ........................ 475/207 X |

FOREIGN PATENT DOCUMENTS

| 47061 | 3/1982 | Japan .......................... 475/193 |
| 402195053 | 8/1990 | Japan .......................... 475/193 |
| 37462 | 2/1991 | Japan .......................... 475/214 |
| 298676 | 10/1928 | United Kingdom ............ 475/215 |
| 957145 | 5/1964 | United Kingdom . |
| 1118260 | 6/1968 | United Kingdom . |
| 1119988 | 7/1968 | United Kingdom . |
| 1479765 | 7/1977 | United Kingdom . |

OTHER PUBLICATIONS

International Publication No. WO 88/07149; International Application No. PCT/US88/00675; Date: Sep. 22, 1988.

Primary Examiner—Khoi Q. Ta
Attorney, Agent, or Firm—Nikaido, Marmelstein, Murray & Oram LLP

[57] ABSTRACT

A frictional type continuously variable transmission having a continuously variable transmission unit with a planetary gear unit attached thereto to increase the speed ratio as a whole while not increasing the size of the entire device. This transmission is composed of the continuously variable transmission, a planetary gear unit and an impeller unit. The planetary gear unit has a drive shaft, a carrier fixed to the drive shaft, a plurality of planetary gears supported on the carrier, and an internal gear meshing with the planetary gears. The continuously variable transmission unit has an input shaft to which is fixed a sun gear meshing with the planetary gear. With this arrangement, the impeller can be rotated at a high speed even if the speed ratio of the continuously variable transmission unit is low. The transmission unit also has a pressing mechanism at the input shaft end. Thus, it is possible to manufacture the three units separately and assemble them together.

5 Claims, 4 Drawing Sheets

FRICTION TYPE CONTINUOUSLY VARIABLE TRANSMISSION

BACKGROUND OF THE INVENTION

This invention relates to a friction type continuously variable transmission for continuously adjusting the rotational speed of a shaft for driving a rotary member that is rotated at high speed, such as an impeller of a centrifugal blower, a centrifugal compressor or a radial turbine to rotate the impeller-carrying output shaft at a constant speed irrespective of the rotational speed of the input shaft.

FIG. 4 shows a conventional friction type continuously variable transmission. It has an input shaft 2 and an output shaft 3 which are rotatably mounted in a housing 1 on both sides thereof so as to be coaxial with each other. A plurality of double cones 4 are mounted in the housing 1 around the output shaft 3 so as to be rotatable about their own axes but not about the axis of the output shaft 3. They are rotatably supported on support shafts 6 of a carrier 5 that is movable axially of the output shaft 3.

The input shaft 2 has at one end thereof an input ring 7 kept in contact with one conical surface 4a of each double cone 4. The output shaft 3 is provided at its free end with a drive cone 8 that is kept in contact with the other conical surface 4b of each double cone 4.

The conical surfaces 4a, 4b of the double cones 4, the input ring 7 and the drive cone 8 are arranged such that the reaction force to the contact pressure between the input ring 7 and the double cones 4 that acts on the frictional contact surfaces of the double cones 4 due to the biasing force of springs 10 acts as axial forces on the input shaft 2 and the output shaft 3 to pull them away from each other.

The rotation of the input shaft 2 is transmitted to the double cones 4 through the input ring 7. The rotation of the double cones 4 is then transmitted to the output shaft 3 through the drive cone 8. An impeller or the like mounted on the output shaft 3 is thus rotated. The rotational speed of the output shaft 3 is variable by moving the double cones 4 axially of the output shaft 3 by means of a drive means 9 drivingly coupled to the carrier 5.

The double cones of this friction type continuously variable transmission are shaped so that their vertical section including the rotation axis is substantially symmetrical with respect to their maximum diameter where the peripheral speed is maximum. If this transmission is used as a step-up gear, its speed increasing ratio n is given by the following equation.

$$n = \frac{bd}{ac}$$

where d and c (see FIG. 4) are the radii of rotation of the input ring 7 and the double cones 4, respectively, at the contact portions between the input ring 7 and the double cones 4; and b and a are the radii of rotation of the double cones 4 and the drive cone 8, respectively, at the contact portions between the double cones 4 and the drive cone 8.

In order to increase the speed increasing ratio n, b has to be increased and/or c has to be reduced. Namely, if the section of the double cones 4 including their rotation axis is shaped substantially symmetrical with respect to their maximum diameter, the higher the speed increasing ratio n is set, the smaller the effective usable conical surface of the double cones 4 will be. Thus, in order to increase the speed increasing ratio, the dimension b has to be increased by using larger cones 4.

The speed increasing ratio attainable with this type of transmission (if used as a step-up gear) is typically about 7–26. But this figure varies from one arrangement to another. There is known a friction type continuously variable transmission which can change this ratio within a wider range.

When using such a friction type continuously variable transmission to drive a rotary member which are rotated at high speed, such as the impeller of a centrifugal compressor, it is desirable that it has a wide range of speed increasing ratio. But this often leads to a reduction in power transmission efficiency, which is not desirable for high-speed rotation application. The friction type continuously variable transmission shown in FIG. 4 is adapted for high-speed rotation but has a shortcoming in that its speed increasing ratio is relatively low.

If the transmission shown in FIG. 4 is used for a supercharger of an automobile, the rotational speed of the impeller will be kept low while the engine speed is low because of relatively low speed increasing ratio. Since the rotational speed of the impeller is low, it is impossible to sufficiently increase the pressure ratio. Namely, in order for the supercharger to be capable of producing enough compression work even at a low input rotational speed, it is imperative that the transmission have a sufficiently high speed increasing ratio.

Also, when using such a friction type continuously variable transmission, it is necessary to produce a high contact pressure at the contact surfaces between the rotary members for efficient torque transmission. Thus, it is necessary to provide such a transmission with torque-sensing load mechanism such as torque cams. A gear train also have to be coupled to the transmission. The entire mechanism is thus bulky and difficult to assemble.

In such an arrangement as shown in FIG. 4 in which the double cones have a symmetrical shape with respect to the maximum diameter, the double cones have to be large in size for large speed increasing ratio. This leads to increase in the size of the transmission itself.

Another problem of such a friction type continuously variable transmission is that if used to drive a rotary member that rotates at high speed, such as the impeller of a centrifugal compressor, the output shaft 3, which also rotates at high speed, tends to induce a large amplitude of vibration even with the slightest weight unbalance. Thus, it is necessary to perform balancing the output shaft 3 with high accuracy. In order to achieve better balancing of a long output shaft, mass adjustment is required in at least two axially separated correction planes of the output shaft. If the impeller is mounted on the left end of the output shaft 3, balancing at this end is done by removing unbalance weight of the impeller or the impeller mounting portion of the shaft. At the other end to which the drive cone 8 is mounted, balancing has to be done by removing unbalance weight of the drive cone itself. But changing the shape of the drive cone for balancing is not desirable because it has to be brought into contact with the double cones with high accuracy.

In FIG. 4, the diameter of the drive cone 8 at its extreme left end is sufficiently large compared with the diameter of the output shaft 3, so that the double cones 4 will never come into contact with the output shaft 3. But if it is desired to increase the speed ratio, the axial length of the conical surfaces 4b of the double cones 4 has to be increased. This increases the possibility of the double cones coming into contact with the output shaft while in operation.

An object of this invention is to provide a friction type continuously variable transmission whose speed increasing ratio can be set high, without increasing the size of double cones even while the input rotational speed is low, and which is compact and easy to assemble.

SUMMARY OF THE INVENTION

In order to achieve this object, the friction type continuously variable transmission according to this invention comprises a friction type continuously variable transmission unit having an input shaft provided near one end thereof, and a planetary gear unit mounted to the one end of the transmission unit, the planetary gear unit comprising a drive shaft, a carrier coupled to the drive shaft, a plurality of planetary gears supported on the carrier, an internal gear meshing with the planetary gears, and a sun gear fixedly mounted on the input shaft of the friction type continuously variable transmission unit and meshing with the planetary gears.

In another arrangement, the friction type continuously variable transmission unit comprises an output shaft aligned with the input shaft and having a drive cone, the input shaft carrying an input ring, and a plurality of double cones disposed around the output shaft so as to be rotatable about their own axes but not about the axis of the output shaft, each double cone having two flat end faces that intersect the rotation axis of the double cone at a right angle and define the axial length of said double cone therebetween, a conical surface connected to one of the end faces and kept in frictional contact with the input ring of the input shaft, a conical surface connected to the other of the end faces and kept in frictional contact with the drive cone of the output shaft, the conical surfaces being connected to each other through at least one curved or flat surface.

In still another arrangement, the output shaft is formed with a small-diameter portion near the drive cone to prevent the double cones from coming into contact with the output shaft.

In this arrangement, when the drive shaft of the planetary gear unit rotates, planetary gears, meshing with the internal gear, begin to rotate about their own axes and at the same time around the axis of the sun gear. Thus, the input gear of the friction type continuously variable transmission unit, which is fixed to the sun gear, is driven at an increased speed. The impeller mounted on the output shaft is thus rotated at high speed, while keeping high power transmission efficiency.

In the second arrangement, the section of each double cone including its rotation axis is asymmetrical with respect to its maximum diameter so that its turning radius is sufficiently large at a point where it is brought into contact with the drive cone and sufficiently small at a point where it is brought into contact with the input ring. With this arrangement, it is possible to increase the speed increasing ratio without increasing the size of the double cones and thus without increasing the size of the entire device.

In the third arrangement, the output shaft has a small-diameter portion near the drive cone. By forming this portion, it is possible to prevent interference between the output shaft and the double cones irrespective of the shape and mounting angle of the double cones.

Other features and objects of the present invention will become apparent from the following description made with reference to the accompanying drawings, in which:

DETAILED DESCRIPTION OF THE PREFERRED EMBODIMENT

Figure 1:
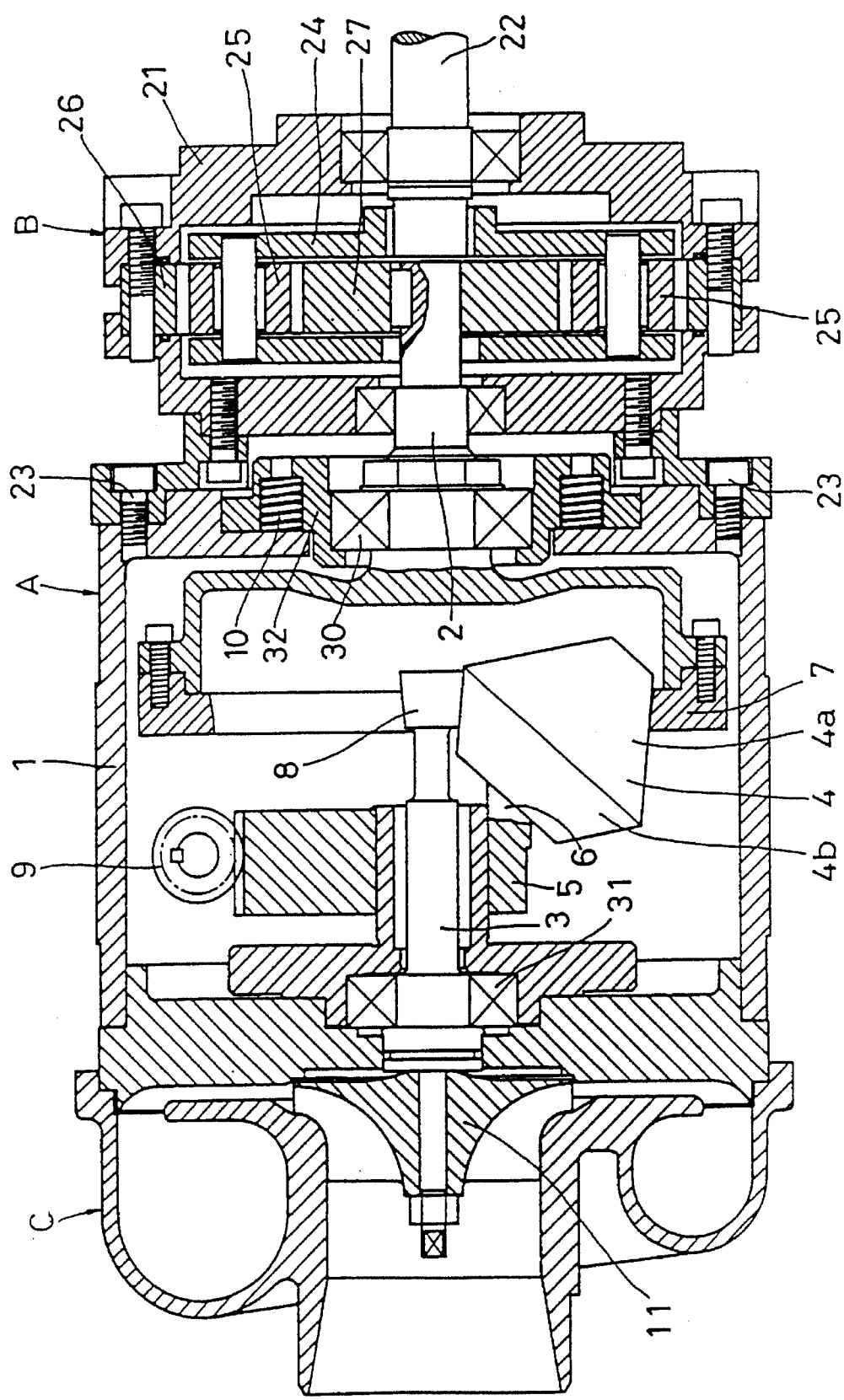
FIG. 1 is a vertical sectional view of a friction type continuously variable transmission of a first embodiment.

We will describe the embodiment shown in FIG. 1.

The friction type continuously variable transmission shown in FIG. 1 comprises a friction type continuously variable transmission unit A, a planetary gear unit B mounted on the input side of the unit A, and an impeller unit C mounted on the output side of the unit A. The rotation transmitted to the input end of the planetary gear unit B is accelerated by the planetary gear unit B and the friction type continuously variable transmission unit A to rotate the impeller unit C at high speed.

Figure 4:
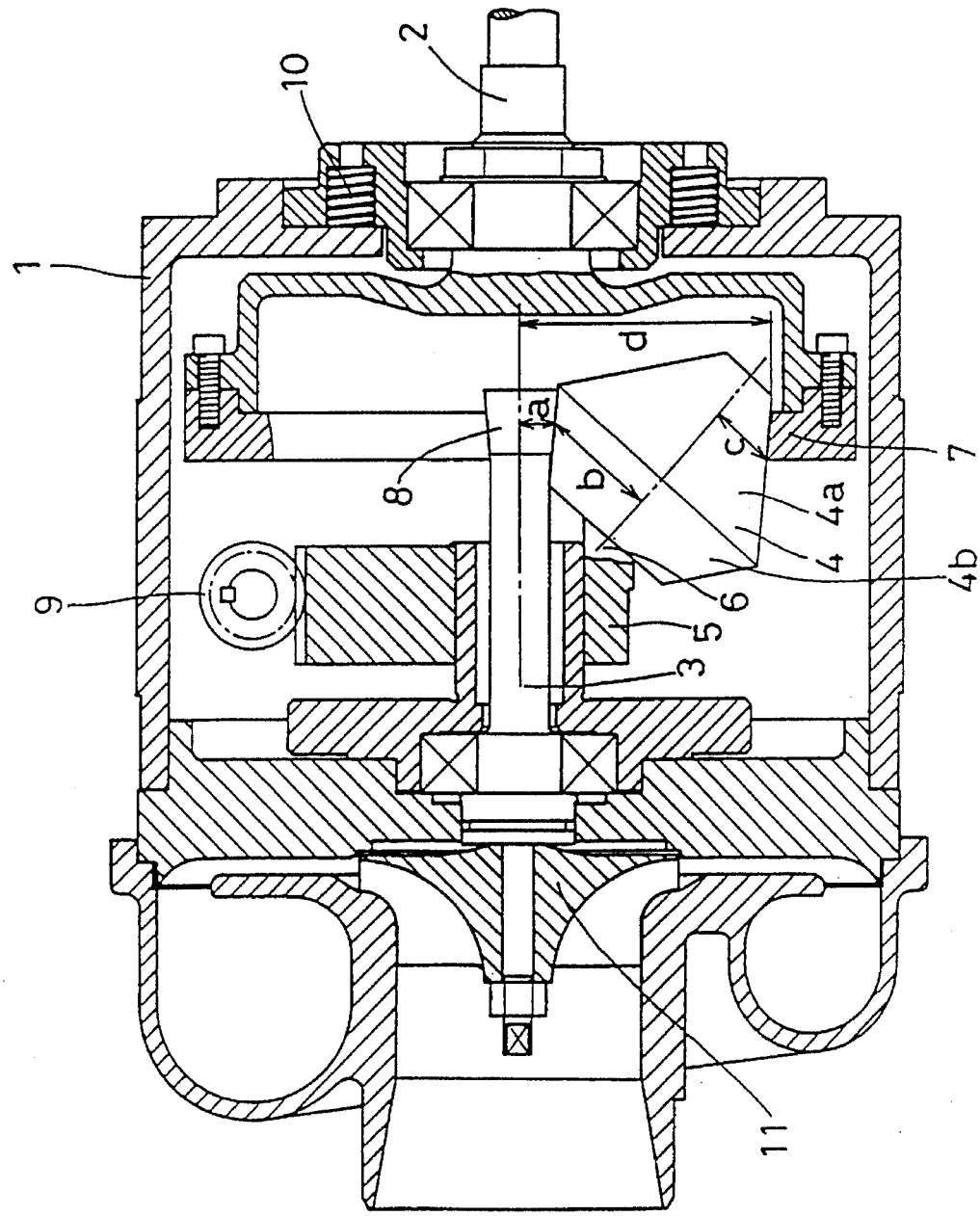
FIG. 4 is a vertical sectional view of a conventional friction type continuously variable transmission.

The friction type continuously variable transmission unit A is substantially the same in structure as the one shown in FIG. 4. Thus, the same elements are denoted by the same numerals as in FIG. 4 and their description is not repeated.

The friction type continuously variable transmission unit A has a holder 32 or disc-shaped housing fitted on and secured to an outer ring of a bearing 30 for an input shaft 2 to support the bearing. A plurality of compression springs 10 forming a pressing mechanism are arranged circumferentially between the opposed surfaces of the holder 32 and the housing 1.

The compression springs 10 urge or pull the input shaft 2 away from the housing 1 through the holder 32 and the bearing 30, thus producing a contact pressure at the frictional contact surfaces between the double cones 4 and the input ring 7.

The reaction force of the contact pressure produced between the double cones 4 and the input ring 7 acts on the cone 8 through the double cones 4, thus pulling the output shaft 3 rightwardly in the figure. But it will actually never move in this direction because the outer ring of a bearing 31 supporting the output shaft 3 is secured to the housing 1.

In other words, the input shaft 2 and the output shaft 3 are pulled axially away from each other by the compression springs 10, so that a constant contact pressure is produced at the frictional contact surfaces of the double cones 4 by the axial forces of the input shaft 2 and the output shaft 3.

Since the pressing mechanism is made up of a plurality of circumferentially arranged compression springs 10, each spring may be small in size, so that the pressing mechanism can be made small. Another advantage of this arrangement is that the line of action of the load can be easily aligned with the axis of the shafts. Such alignment is difficult if a single spring is provided. It is also possible to apply uniform contact pressure to the plurality of double cones 4 by individually adjusting the spring constants of the springs.

The planetary gear unit B comprises a housing 21 and a drive shaft 22 rotatably supported in the housing 21. The planetary gear unit B is fixed to the housing 1 of the friction type continuously variable transmission unit A by means of bolts 23 at its input shaft side so that the input shaft 2 and the drive shaft 22 are aligned with each other.

A carrier 24 is splined or keyed to the drive shaft 22 of the planetary gear unit B. The carrier 24 rotatably carries a plurality of planetary gears 25 disposed along a single common circumference whose center is located on the axis of the drive shaft 22. The planetary gears 25 are in meshing engagement with an internal gear 26 unrotatably fixed to the housing 21 and with a sun gear 27 splined or keyed to the input shaft 2 of the friction type continuously variable transmission unit A.

The rotational speed ratio between the drive shaft 22 and the input shaft 2 is determined by the numbers of teeth of the sun gear 27, planetary gears 25, and the internal gear 26. When the drive shaft 22 is rotated, the planetary gears 25 rotate about the sun gear 27 together with the carrier 24 and at the same time rotate about their own axes because they are meshing with the internal gear 26. The input shaft 2 of the friction type continuously variable transmission unit A is thus rotated at a higher speed than the drive shaft 22.

With this arrangement, even if the friction type continuously variable transmission unit A itself has a low speed increasing ratio, it is possible to achieve a high speed increasing ratio for the entire transmission and, so that an impeller 11 of the impeller unit C can be driven at a high speed.

More specifically, with this arrangement, the input speed is accelerated in two stages, first by the planetary gear unit B and then by the friction type continuously variable transmission unit A. Thus, even if the speed increasing ratio of the friction type continuously variable transmission A is relatively low, and even in areas where the input speed is low, it is possible to rotate the impeller 11 at a high speed. This system is especially suited for use in a supercharger of an automobile.

The pressing mechanism comprising compression springs 10 is provided in the friction type continuously variable transmission unit A at the end where there is the input shaft 2. This makes it possible to assemble the impeller unit C, the friction type continuously variable transmission unit A and the planetary gear unit B separately from one another and then assemble them together. Thus, the transmission can be manufactured and assembled easily.

Figure 2:
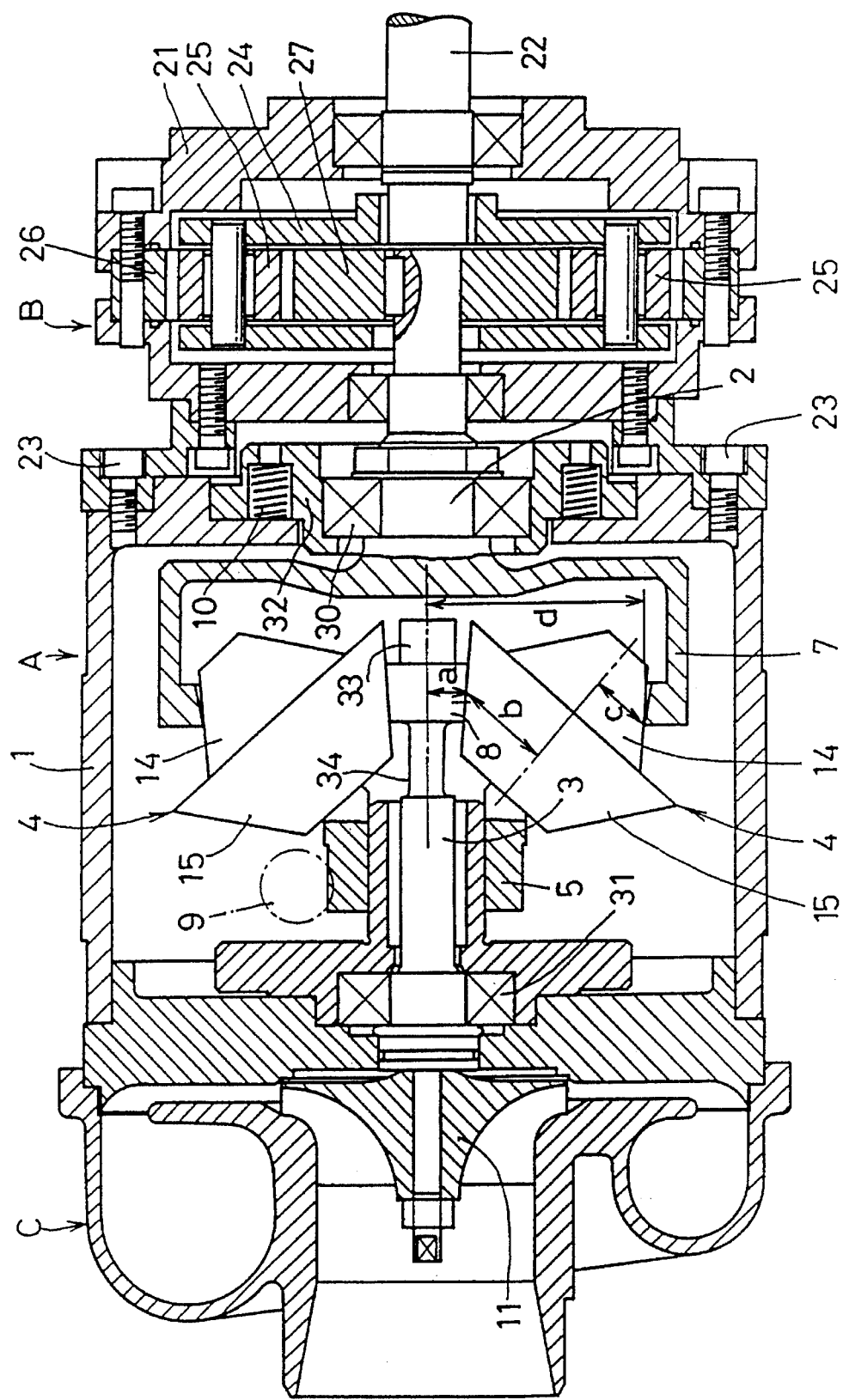
FIG. 2 is a vertical sectional view of a second embodiment.

FIGS. 2 and 3 show the second embodiment. In this embodiment, the same elements as those in the first embodiment are denoted by the same numerals and their description is omitted.

In this embodiment, the vertical section of each double cone 4 including the support shaft 6 is asymmetrical with respect to its maximum diameter. Further, each double cone 4 has two conical surfaces connected together through at least one curved or flat surface.

FIGS. 3A–3D show double cones having different outer configurations.

Figure 3A:
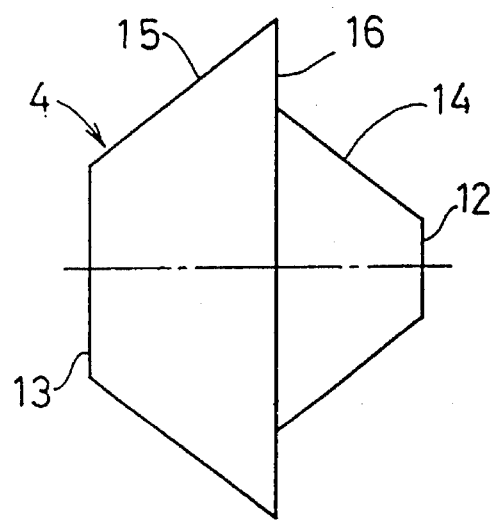
FIGS. 3A to 3D are front views of various double cones having different outer configurations.

The double cone 4 shown in FIG. 3A has two flat surfaces 12, 13 that intersect the rotation axis at a right angle. Thus, the axial length of the cone 4 is equal to the distance between the surfaces 12 and 13. Between the surfaces 12 and 13 are formed a conical surface 14 forming a first cone and a conical surface 15 forming a second cone. The conical surfaces 14 and 15 are connected together through a flat bottom surface 16 which forms the bottom of the second cone.

Figure 3B:
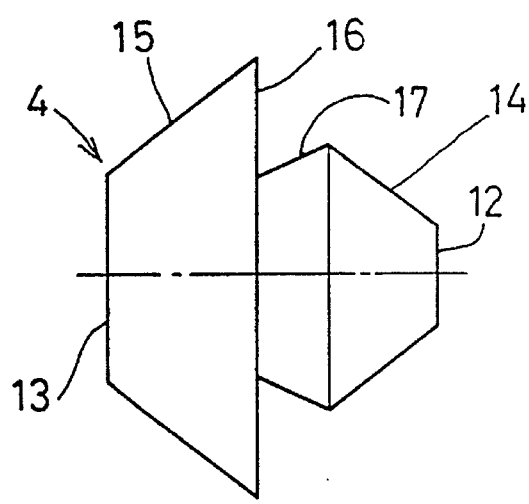

The double cone shown in FIG. 3B has two flat surfaces 12, 13 that intersect the rotation axis at a right angle. Thus, the axial length of the cone is equal to the distance between the surfaces 12 and 13. Between the surfaces 12 and 13 are formed the conical surface 14 forming a first cone, a conical surface 17 tapered conversely to the conical surface 14, and the conical surface 15 forming a second cone. The conical surfaces 14 and 15 are connected together through a flat bottom surface 16 which intersects the rotation axis at a right angle and forms the bottom of the second cone. In this case, the conical surface 17 may be replaced by a cylindrical surface.

Since the conical surfaces 14 and 15 serve as the frictional contact surfaces of the friction type continuously variable transmission, they have to be machined to required hardness, shape and surface roughness not to affect the function unduly. In contrast, the conical surface 17 is provided for reduced weight of the cone. Thus, this portion need not be machined so accurately as for the conical surfaces 14 and 15. In the example of FIG. 3B, the conical surfaces 14 and 15 are connected together through two curved or flat surfaces.

Figure 3C:
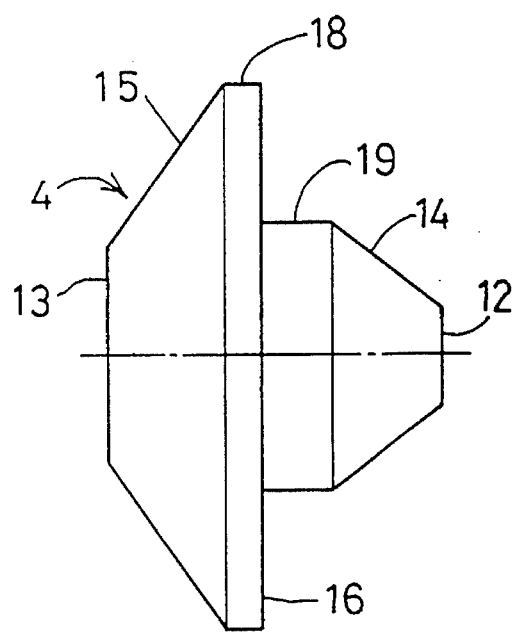
Figure 3D:
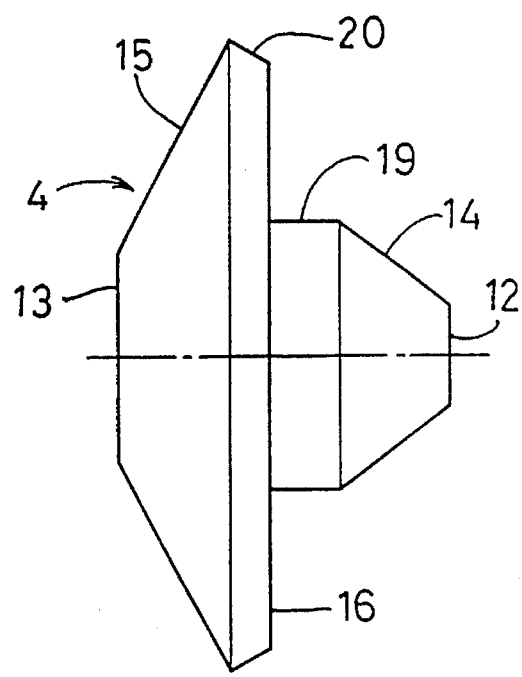

The double cone shown in FIG. 3C has a cylindrical surface 19 between the conical surfaces 14 and 15. The cone bottom 16 is connected to the conical surface 15 of the second cone not directly but through a cylindrical surface 18. The cylindrical surface 18 may be replaced by a conical surface 20 as shown in FIG. 3D. In the examples of FIGS. 3C and 3D, three curved or flat surfaces are formed between the conical surfaces 14 and 15.

Also, though not shown, the double cones may have two conical surfaces 14 and 15, and four or more curved or flat surfaces interposed between the conical surfaces 14 and 15.

The double cone shown in FIG. 3A is preferable in that it is simple in shape, having only two conical surfaces 14 and 15, and thus can be formed easily. Another advantage of this double cone is that its axial length can be made shorter. This structure is especially favorable in an application where the absolute value of the speed ratio is relatively small, e.g. 8–24, 6–18 or 4–12 because with this arrangement, the conical surfaces 14 and 15 can be provided close to each other, so that the entire cone can be made smaller. The smaller the double cones, the more easily they can be mounted in the transmission.

The double cones used in the friction type continuously variable transmission according to this invention are shaped so that the conical surface 14 forming the first cone does not intersect the conical surface 15 forming the second cone at the maximum-diameter plane. This arrangement makes it possible to shorten the axial length of the conical surface 14 forming the first cone. This contributes to a further reduction in the size of the double cone.

Also in this embodiment, as shown in FIG. 2, the output shaft 3 has at its right end a balancing correction portion 33. This portion would not interfere with the double cones 4 when they are slid axially for continuous speed control. Also, this area in the friction type continuously variable transmission is a dead space usually not used, so that the provision of the balancing correction portion 33 in this area would not lead to increase in the overall size either axially or diametrically. Also, there is no need to take off so large a mass of the correction portion 33 to adjust the mass distribution of the output shaft 3 because this portion is located at the end of the output shaft 3 and thus the farthest from the center of gravity of the shaft.

Also in FIG. 2, the output shaft 3 has a small-diameter portion 34 at the left of the drive cone 8. This portion serves to prevent the interference of the double cones 4 with the output shaft 3, irrespective of the shape of the drive cone 8 or the double cones 4 and the mounting angle of the double cones 4.

In the friction type continuously variable transmission of the second embodiment, double cones 4 shown in FIG. 3A are used. Since the conical surfaces 14 and 15 of the double cone are asymmetrical with respect to its maximum-diameter plane, it is possible to increase the radius of rotation b of the double cones 4 at the portion where they are brought into contact with the drive cone 8, while at the same time to reduce the radius of rotation c of the double cones 4 at the portion where they are brought into contact with the input ring 7. In other words, it is possible to increase the speed increasing ratio without increasing the size of the double cones 4.

Also, the small-diameter portion 34 formed on the output shaft 3 makes it possible to prevent the interference between the double cones 4 and the output shaft 3 even if the drive cone 8 is relatively small in diameter and the double cones 4 have the conical surfaces 14 and 15.

What is claimed is:

1. A friction type continuously variable transmission comprising a friction type continuously variable transmission unit comprising an input shaft, an output shaft, and a transmission means coupled to said input shaft at one end thereof and said output shaft at the other end thereof for rotating said output shaft at a speed higher than the rotating speed of said input shaft, and a planetary gear unit comprising a drive shaft, a carrier coupled to said drive shaft, a plurality of planetary gears supported on said carrier, an internal gear unrotatably fixed and meshing with said planetary gears, and a sun gear fixedly mounted on said input shaft of said friction type continuously variable transmission unit and meshing with said planetary gears.

2. A friction type continuously variable transmission as claimed in claim 1 wherein said friction type continuously variable transmission unit comprises an output shaft aligned with said input shaft and having a drive cone, said input shaft carrying an input ring, and a plurality of double cones disposed around said output shaft so as to be rotatable about their own axes but not about the axis of said output shaft, said each double cone having two flat end faces that intersect the rotation axis of said double cone at a right angle and define the axial length of said double cone therebetween, a conical surface connected to one of said end faces and kept in frictional contact with said input ring of said input shaft, a conical surface connected to the other of said end faces and kept in frictional contact with said drive cone of said output shaft, said conical surfaces being connected to each other through at least one flat surface.

3. A friction type continuously variable transmission as claimed in claim 1 wherein said output shaft is formed with a small portion near said drive cone having a diameter small enough to prevent said double cones from coming into contact with said output shaft.

4. A friction type continuously variable transmission as claimed in claim 1, wherein said friction type continuously variable transmission unit comprises an output shaft aligned with said input shaft and having a drive cone, said input shaft carrying an input ring, and a plurality of double cones disposed around said output shaft so as to be rotatable about their own axes but not about the axis of said output shaft, said each double cone having two flat end faces that intersect the rotation axis of said double cone at a right angle and define the axial length of said double cone therebetween, a conical surface connected to one of said end faces and kept in frictional contact with said input ring of said input shaft, a conical surface connected to the other of said end faces and kept in frictional contact with said drive cone of said output shaft, said conical surfaces being connected to each other through at least one curved surface.

5. A friction type continuously variable transmission as claimed in claim 4, wherein said output shaft is formed with a portion near said drive cone having a diameter small enough to prevent said double cones from coming into contact with said output shaft.

* * * * *